United States Patent [19]

Baum et al.

[11] Patent Number: 5,446,763
[45] Date of Patent: Aug. 29, 1995

[54] APPARATUS AND METHOD FOR CONVERTING SOFT SYMBOLS INTO SOFT BITS

[75] Inventors: Kevin L. Baum, Hoffman Estates; Bruce D. Mueller, Palatine, both of Ill.

[73] Assignee: Motorola, Inc., Schaumburg, Ill.

[21] Appl. No.: 57,600

[22] Filed: May 6, 1993

Related U.S. Application Data

[63] Continuation-in-part of Ser. No. 724,663, Jul. 2, 1991, Pat. No. 5,214,675.

[51] Int. Cl.⁶ .............................................. H04L 27/06
[52] U.S. Cl. ...................... 375/340; 341/52; 375/283
[58] Field of Search ............... 375/80, 84, 94, 56, 375/27; 455/214; 371/30; 341/52, 51

[56] References Cited

U.S. PATENT DOCUMENTS 5,010,554  4/1991  Bechtel et al. ................... 371/37.1
5,182,749  1/1993  Kazecki et al. ...................... 375/56

Primary Examiner—Stephen Chin
Assistant Examiner—T. Ghebretinsae
Attorney, Agent, or Firm—Kevin D. Kaschke

[57] ABSTRACT

In a communication unit (200) that coherently demodulates differentially-encoded modulated signals (201) to produce soft symbols (210) including first and second soft symbols, a method and associated apparatus, for use by the communication unit (200), converts the soft symbols (210) into soft bits (212). A quality measure (305) is determined for at least the first soft symbol (210) indicating when the quality for the first soft symbol (210) is favorable and when the quality for the first soft symbol (210) is unfavorable. The first and second soft symbols (210) are processed in a forward direction in time (208) to produce the soft bits (212) when the quality measure (305) for the first soft symbol (210) is favorable. The first and second soft symbols (210) are processed in a reverse direction in time (209) to produce the soft bits (212) when the quality measure (305) for the first soft symbol (210) is unfavorable.

24 Claims, 7 Drawing Sheets

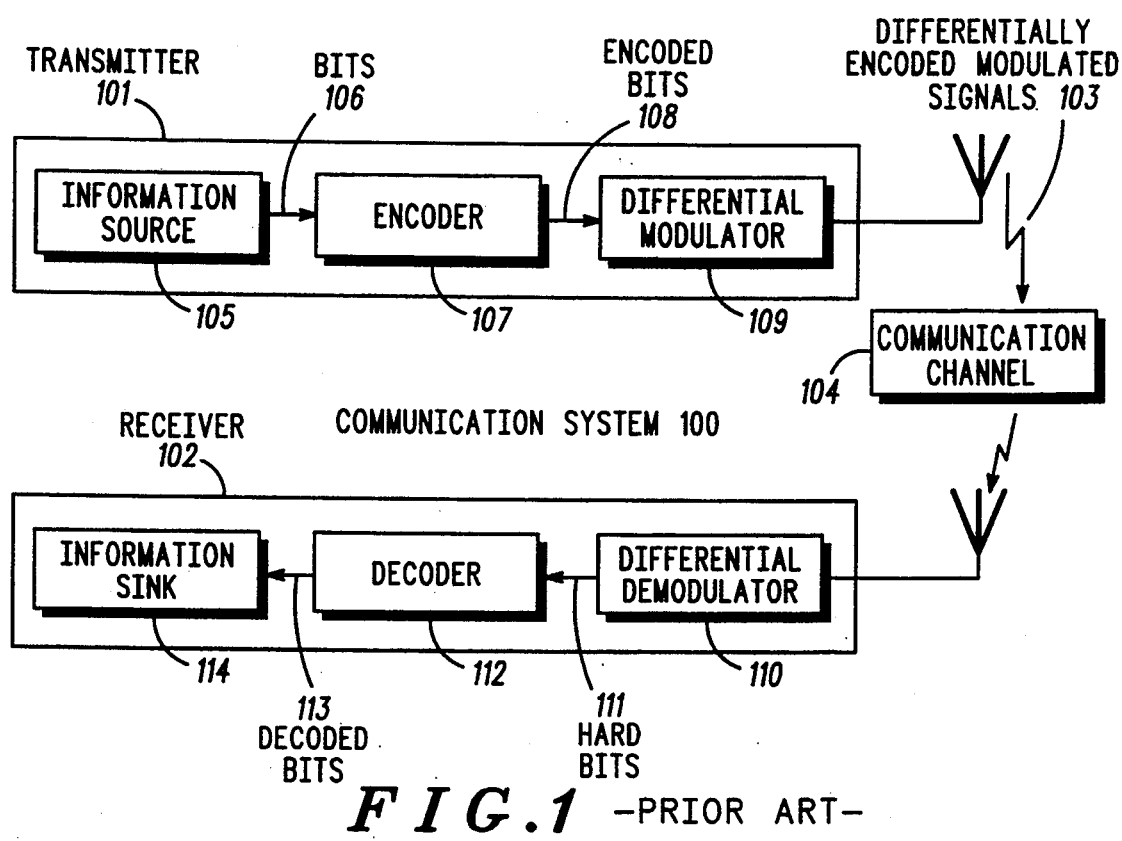
FIG.1 —PRIOR ART—
FIG.2
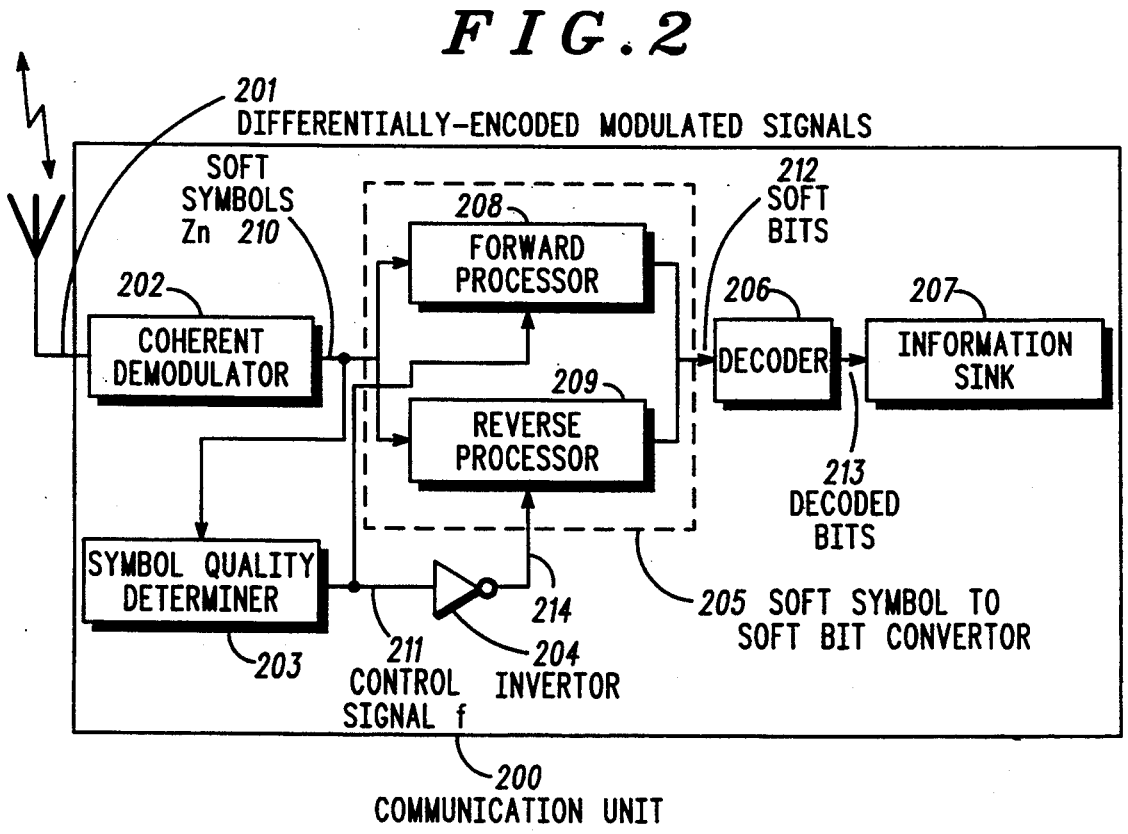

APPARATUS AND METHOD FOR CONVERTING SOFT SYMBOLS INTO SOFT BITS

RELATED APPLICATIONS

The present invention is a continuation in part of patent application Ser. No. 07/724,663, filed on Jul. 2, 1991, U.S. Pat. No. 5,214,675 assigned to the assignee of the present invention.

FIELD OF THE INVENTION

The present invention relates generally to a communication unit that produces soft symbols and more particularly to an apparatus and method for converting soft symbols into soft bits.

BACKGROUND OF THE INVENTION

The basic operation and structure of communication systems such as cellular radio telephone systems communication systems and land mobile communication systems are well known in the art. Communication systems typically comprise a plurality of communication units, a predetermined number of base station (or repeaters) located throughout a geographic region and a controller. The communication units may be vehicle mounted or portable units and comprise either a transmitter or a receiver or both to form transceiver. The communication unit is coupled to the base station by a communication channel over which radio frequency (RF) signals are transmitted and/or received. The controller comprises a centralized call processing unit or a network of distributed controllers working together to establish communication paths for the communication units.

FIG. 1 illustrates a prior art communication system 100 including at minimum a transmitter 101 and a receiver 102 communicating over a communication channel 104. The information source 105 provides bits at line 106 for an encoder 107. The encoder 107 is typically used to add redundancy to the information bits so that bit detection errors in the receiver can be corrected. The encoder 107 receives the bits at line 106 and produces encoded bits at line 108 for the differential modulator 109. The differential modulatar 109 receives the encoded bits at line 108, performs differential encoding, and produces differentially-encoded modulated signals 103 for transmission to the receiver 102 over the communication channel 104. The receiver 102 receives the differentially-encoded modulated signals 103 at the input to a differential demodulator 110 to produce hard bits at line 111. A decoder 112 receives the hard bits (logical 0 or logical 1) at line 111 and produces decoded bits at line 113 for an information sink 114.

It is readily known in the art that a differentially-encoded modulated signal can be coherently or differentially demodulated. It is also readily known in the art that the use of coherent demodulation will result in a lower received bit error rate than the use of differential demodulation. In a conventional coherent demodulation approach to receiving a differentially-encoded modulated signal, first and second soft symbols are detected to produce first and second detected symbols. The first and second detected symbols are then processed to produce hard bits at line 111. However, communication systems that utilize error correction coding such as convolutional encoding in the encoder 107 to mitigate channel errors are readily known in the art to produce a lower decoded bit error rate when soft bits are coupled to the decoder 112 than when hard bits at line 111 are coupled to the decoder 112.

Therefore, there is a need for an apparatus and method for converting the soft symbols into soft bits in a communication unit that coherently demodulates a differentially-encoded modulated signal transmitted thereto to produce soft symbols.

BRIEF DESCRIPTION OF THE DRAWINGS

FIG. 1 illustrates a prior art communication system including a transmitter and a receiver.

FIG. 2 illustrates a communication unit including a soft bit to soft symbol converter having a forward and reverse processor, and a symbol quality determiner in accordance with the present invention.

DETAILED DESCRIPTION OF THE PREFERRED EMBODIMENTS

Figure 3:
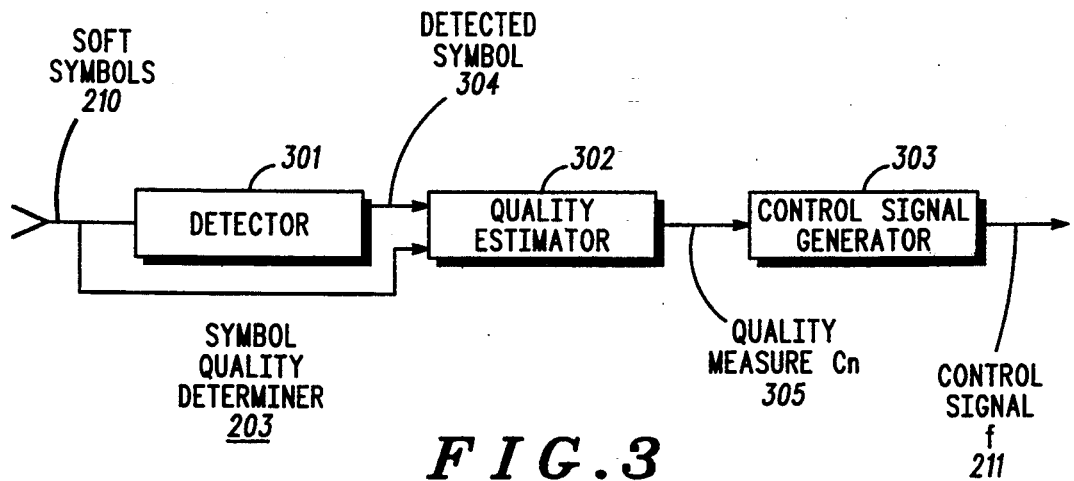
FIG. 3 illustrates a block diagram of the symbol quality determiner and a control signal generator of FIG. 2 in accordance with the present invention.

Generally, the present invention provides an apparatus and method for converting first and second soft symbols into soft bits in a communication unit that coherently demodulates a differentially-encoded modulated signal. This is accomplished by determining a quality measure for at least the first soft symbol indicating when the quality for the first soft symbol is favorable and when the quality for the first soft symbol is unfavorable. The first and second soft symbols are processed in a forward direction in time to produce the soft bits when the quality measure for the first soft symbol is favorable. The first and second soft symbols are processed in a reverse direction in time to produce the soft bits when the quality measure for the first soft symbol is unfavorable.

The first and second soft symbols are processed in a forward direction in time by detecting the first soft symbol to produce a detected symbol, and generating the soft bits responsive to the detected symbol and the second soft symbol. The first and second soft symbols are processed in a reverse direction in time by detecting the second soft symbol to produce a detected symbol, and generating the soft bits responsive to the detected symbol and the first soft symbol.

An advantage of the present invention over prior art is that the present invention produces more accurate soft bits by removing the noise from one of the soft symbols. An example illustrating the benefit of the present invention is described in conjunction with the description of FIGS. 7 and 9.

The present invention can be more fully described with reference to FIGS. 2-10. FIG. 2 illustrates a communication unit 200 constructed in accordance with the present invention. The communication unit 200 generally comprises a coherent demodulator 202, a symbol quality determiner 203, an invertor 204, a soft symbol to soft bit converter 205, a decoder 206, and an information sink 207. Coherent demodulator 202 translates the radio frequency received signal to baseband and maintains phase and timing coherence with the differentially-encoded modulated signal to produce a soft symbol, as is known in the art. In other words, a soft symbol at line 210 is a signal that has been received and coherently mixed to baseband but not yet detected. More generally, a soft symbol at line 210 is a received signal includes both a transmitted symbol component and a channel disortion component. Individually, the coherent demodulator 202, the invertor 204, the decoder 206, and the information sink 207 are readily known in the art, thus no further discussion will be given other than to further illustrate the present invention.

The soft symbol to soft bit converter 205 generally comprises a forward processor 208 and a reverse processor 209. The communication unit 200 can also include a transmitter (not shown) to form a transceiver unit. For example, a transceiver unit can be part of a mobile cellular radio telephone, such as model SUF1700B, manufactured by Motorola, Inc. The communication unit 200 is operative to receive and decode differentially-encoded modulated signals 201 transmitted thereto over a communication channel. The communication unit 200 comprises a coherent demodulator 202 coupled to receive the differentially-encoded modulated signals 201, and operative to coherently demodulate the differentially-encoded modulated signals to produce soft symbols 210 including first and second soft symbols.

A symbol quality determiner 203 is coupled to receive the soft symbols at line 210 and operative to generate a control signal at line 211 indicative of the quality of the first soft symbol. Control signal at line 211 generally has a value of logical "1" when the quality measure for the first soft symbol is favorable, and a value of logical "0" when the quality measure for the first soft symbol is unfavorable.

The forward processor 208 is coupled to receive the soft symbols at line 210 and control signal at line 211 and operative to process the first and second soft symbols in a forward direction in time to produce the soft bits at line 212 when the quality measure for the first soft symbol is favorable. The reverse processor 209 is coupled to receive the soft symbols and an inverted control signal at line 214, and operative to process the first and second soft symbols in a reverse direction in time to produce the soft bits at line 212 when the quality measure for the first soft symbol is unfavorable.

A decoder 206 is coupled to receive the soft bits at line 212 and operative to decode the soft bits to produce decoded bits at line 213. The decoder 206 is typically a Viterbi decoder when convolutional error correction coding is employed in the modulated signal, as is readily known in the art.

FIG. 3 illustrates a symbol quality determiner 203 of FIG. 2. The symbol quality determiner 203 is operative to generate the control signal at line 211 indicative of the quality measure of the first soft symbol. The symbol quality determiner 203 generally comprises a detector 301, a quality estimator 302, and a control signal generator 303. Individually, the detector 301, the quality estimator 302, and the control signal generator 303 are readily known in the art, thus only a brief description will be given to further illustrate the present invention.

Soft symbol, $z_n$, 210 is detected by detector 301 which produces detected symbol $a_n$, at line 304. The soft symbol at line 210 and the detected symbol at line 304 are coupled to the quality estimator 302 which outputs a quality measure, $c_n$, at line 305. The quality measure 305 is coupled to control signal generator 303 which outputs a control signal, f, at line 211. An example of the operation of quality estimator 302 is provided by the following equation:

$$c_n = Re(z_n a^*_n)$$

where cn is the quality measure, $z_n$, at line 305 is the soft symbol at line 210, $a^*_n$ is the complex conjugate of detected symbol at line 304, and $Re(\bullet)$ signifies taking the real part of the result. A larger value of, $c_n$, at line 305 indicates a more favorable symbol quality measure, which also indicates a higher likelihood that the detected symbol an was detected correctly.

Figure 4:
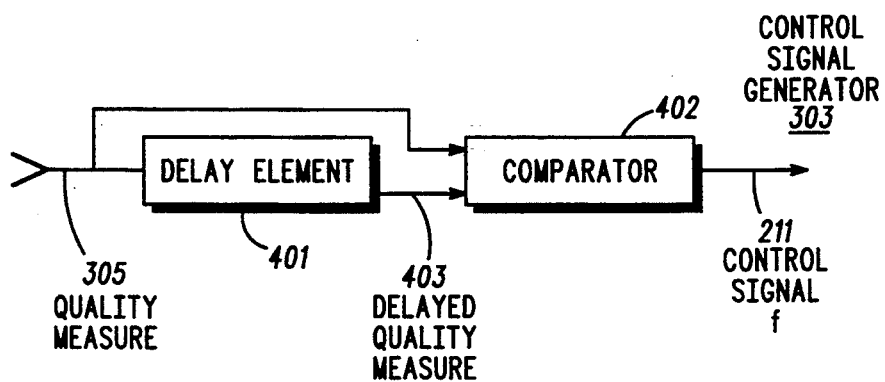
FIG. 4 illustrates block diagram of a preferred embodiment of the control signal generator of FIG. 3 in accordance with the present invention.

FIG. 4 illustrates a preferred embodiment of the control signal generator 303 of FIG. 3. Control signal generator 303 is operative to generate a control signal at line 211 which indicates whether the quality measure for the first soft symbol is favorable or unfavorable. The quality measure for the first soft symbol is favorable when the quality measure for the first soft symbol is greater than or equal to the quality measure for the second soft symbol, and unfavorable when the quality measure for the first soft symbol is less than the quality measure for the second soft symbol.

The control signal generator 303 generally comprises a delay element 401 and a comparator 402. Individually, the delay element 401 and the comparator 402 are readily known in the art, thus no further discussion will be given other than to further illustrate the present invention. The quality measure at line 305 is coupled to the delay element 401, which produces the delayed quality measure at line 403. The delayed quality measure at line 403 is the quality measure for the first soft symbol. The quality measure at line 305 is the quality measure for the second soft symbol. The delayed quality measure at line 403 and quality measure at line 305 are coupled to the comparator 402. The comparator 402 compares quality measure at line 305 with delayed quality measure at line 403 and generates control signal 211 which indicates whether the quality measure for the first soft symbol is favorable or unfavorable.

Figure 5:
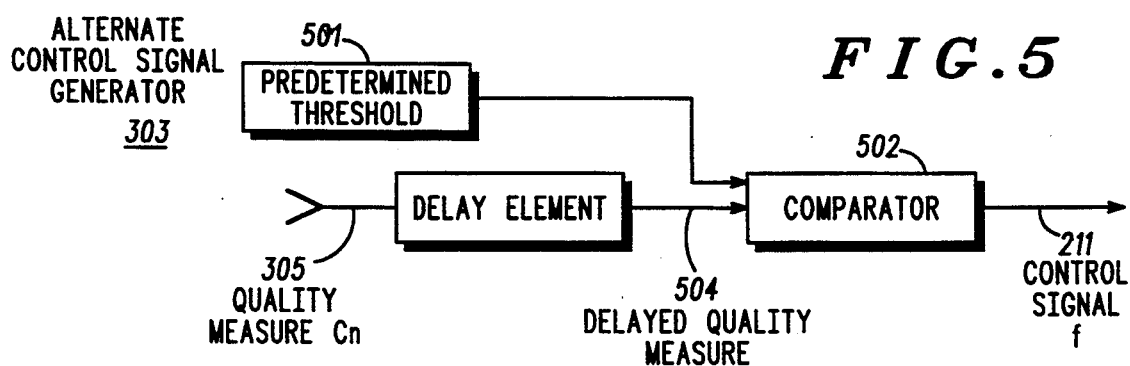
FIG. 5 illustrates block: diagram of an alternate embodiment of the control signal generator of FIG. 3 in accordance with the present invention.

FIG. 5 illustrates an alternate control signal generator 303 of FIG. 3. The alternate control signal generator 303 comprises a predetermined threshold 501, a comparator 502 and a delay element 503. Individually, the predetermined threshold 501, the comparator 502 and the delay element 503 are readily known in the art, thus no further discussion will be given other than to further illustrate the present invention. The quality measure at line 305 is coupled to the delay element 503, which produces the delayed quality measure at line 504. The delayed quality measure at line 504 is the quality measure for the first soft symbol. The predetermined threshold 501 and the quality measure at line 504 of the first soft symbol are coupled to the comparator at line 502. The comparator 502 compares quality measure at line 504 with the predetermined threshold 501 and generates control signal at line 211 which indicates whether the quality measure for the first soft symbol is favorable or unfavorable. The quality measure for the first soft symbol is favorable when the quality measure for the first soft symbol is greater than or equal to the predetermined threshold 501 and unfavorable when the quality measure for the first soft symbol is less than the predetermined threshold 501.

Figure 6:
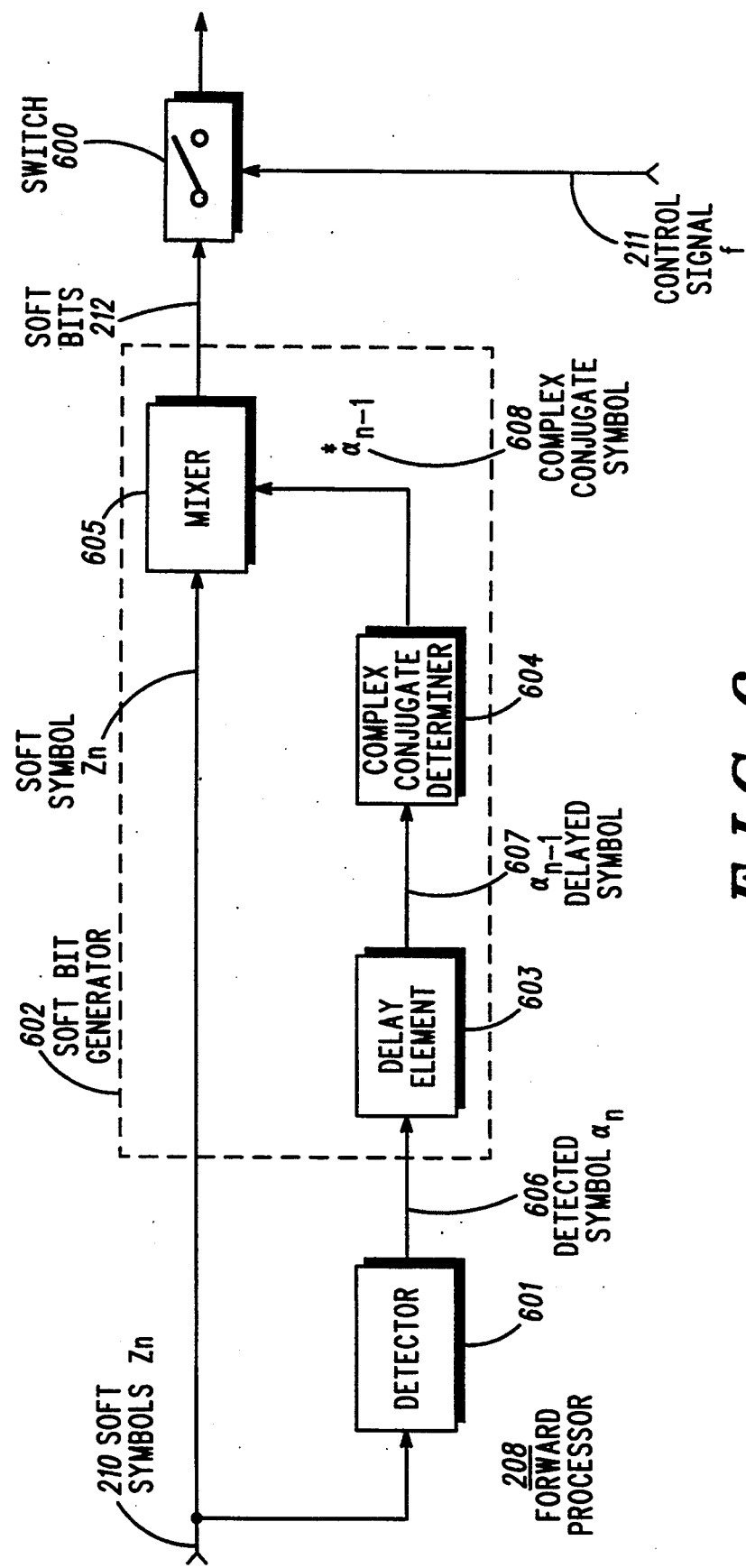
FIG. 6 illustrates a block diagram of the forward processor of FIG. 2 in accordance with the present invention.
Figure 7:
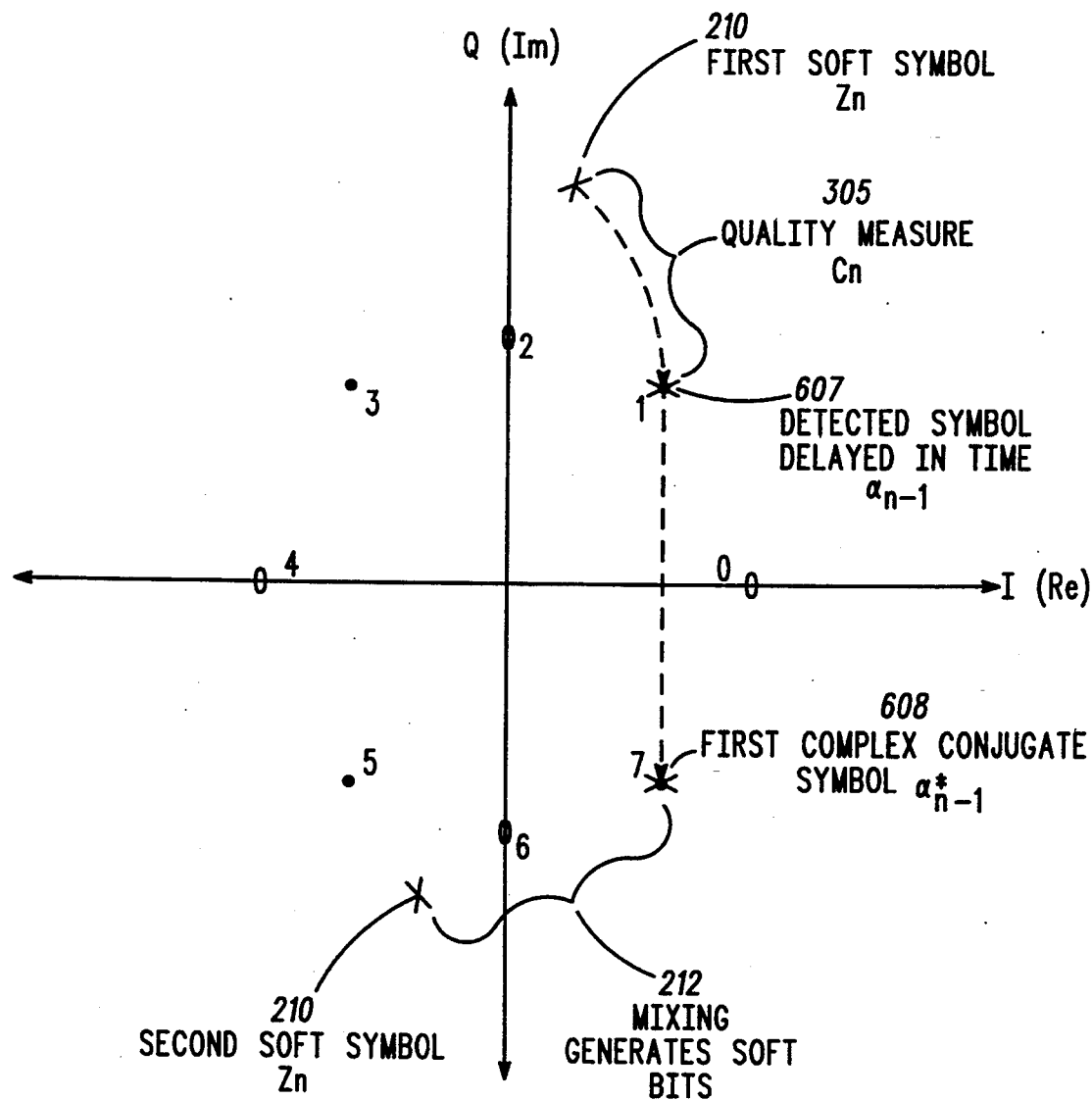
FIG. 7 illustrates the operation of the forward processor of FIG. 6 with a forward processing constellation diagram of a $\pi/4$ DQPSK modulated signal in accordance with the present invention.

Now referring to FIGS. 6 and 7 together, FIG. 6 illustrates a block diagram of the forward processor 208 of FIG. 2. FIG. 7 illustrates the operation of the forward processor of FIG. 6 with a constellation diagram 700 of a π/4 DQPSK modulated signal. π/4 DQPSK modulation and constellation diagram 700 are readily known in the art, thus no further discussion will be given other than to further facilitate understanding of the present invention. In general, the bit information of a π/4 DQPSK modulated signal is contained in the phase change between symbols which are adjacent in time, as is shown in the following mapping:

| bits: | 00 | 01 | 10 | 11 |
|---|---|---|---|---|
| phase change (degrees): | −135 | +135 | −45 | +45 |

It is readily known in the art that hard bits would be produced if two adjacent soft symbols at line 210 were detected and processed by mixing the second detected symbol with the complex conjugate of the first detected symbol. The first bit is obtained by taking the real part of this result and the second bit is obtained by taking the imaginary part. In the present invention, soft bits are produced by detecting only one of the first and second soft symbols.

The forward processor 208 of FIG. 6 produces soft bits at line 212 by processing the soft symbols at line 210 in a forward direction in time. The forward processor 208 of FIG. 6 generally comprises a switch 600, a detector 601, and a soft bit generator 602. The soft bit generator 602 generally comprises a delay element 603, a complex conjugate determiner 604 and a mixer 605. Individually, the switch 600, the detector 601, the soft bit generator 602, the delay element 603, the complex conjugate determiner 604 and the mixer 605 are readily known in the art, thus no further discussion will be given other than to further facilitate the understanding of the present invention.

Processing in a forward direction in time comprises the steps of detecting the first soft symbol to produce a detected symbol at line 606, and generating the soft bits at line 212 responsive to the detected symbol at line 606 and the second soft symbol at line 210. The signal flow through the forward processor 208 of FIG. 6 will now be explained in more detail.

The soft symbols at line 210 and the control signal at line 211 are coupled to the switch at line 600. The switch 600 enables the soft symbols at line 210 to be processed through the forward processor 208 when the quality measure of the first soft symbol is favorable. The soft symbols at line 210 are coupled to the detector 601 and the mixer 605. The detector 601 detects the first soft symbol to produce a detected symbol at line 606.

An example of the operation of detector 601 is shown in FIG. 7, where the first soft symbol is detected to be the constellation point labeled with the number 1, since this is the nearest valid constellation point to the first soft symbol. The detected symbol at line 606 is coupled to the delay element 603. The delay element 603 delays the detected symbol at line 606 to produced a delayed symbol at line 607. The delayed symbol at line 607 is coupled to the complex conjugate determiner 604. The complex conjugate determiner 604 determines the complex conjugate of the delayed symbol at line 607 to produce a complex conjugate symbol at line 608. The complex conjugate symbol at line 608 and the second soft symbol are coupled to the mixer 605. Note that the second soft symbol is the soft symbol that enters forward processor 208 immediately after the first soft symbol, so that the second soft symbol and the complex conjugate symbol 608 are coupled to mixer 605 at the same time because of delay element 603. The mixer 605 multiplies the complex conjugate symbol at line 608 and second soft symbol together to, produce the soft bits 212.

The control signal at line 211 and the soft bits at line 212 are coupled to the switch 600. The switch 600 enables the soft symbols 210 to be processed through the forward processor 208 when the quality measure of the first soft symbol is favorable.

Figure 8:
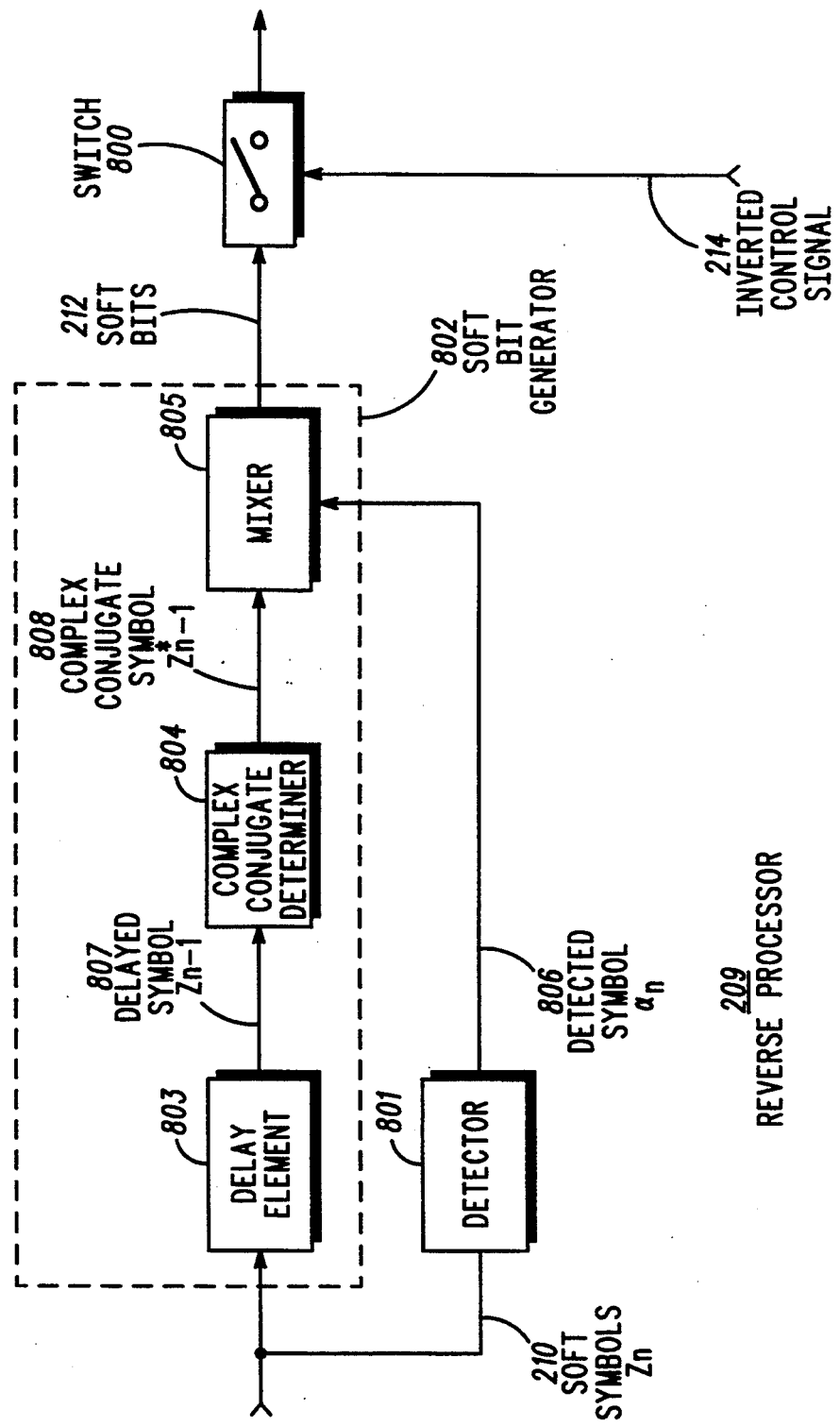
FIG. 8 illustrates a block diagram of the reverse processor of FIG. 2 in accordance with the present invention.
Figure 9:
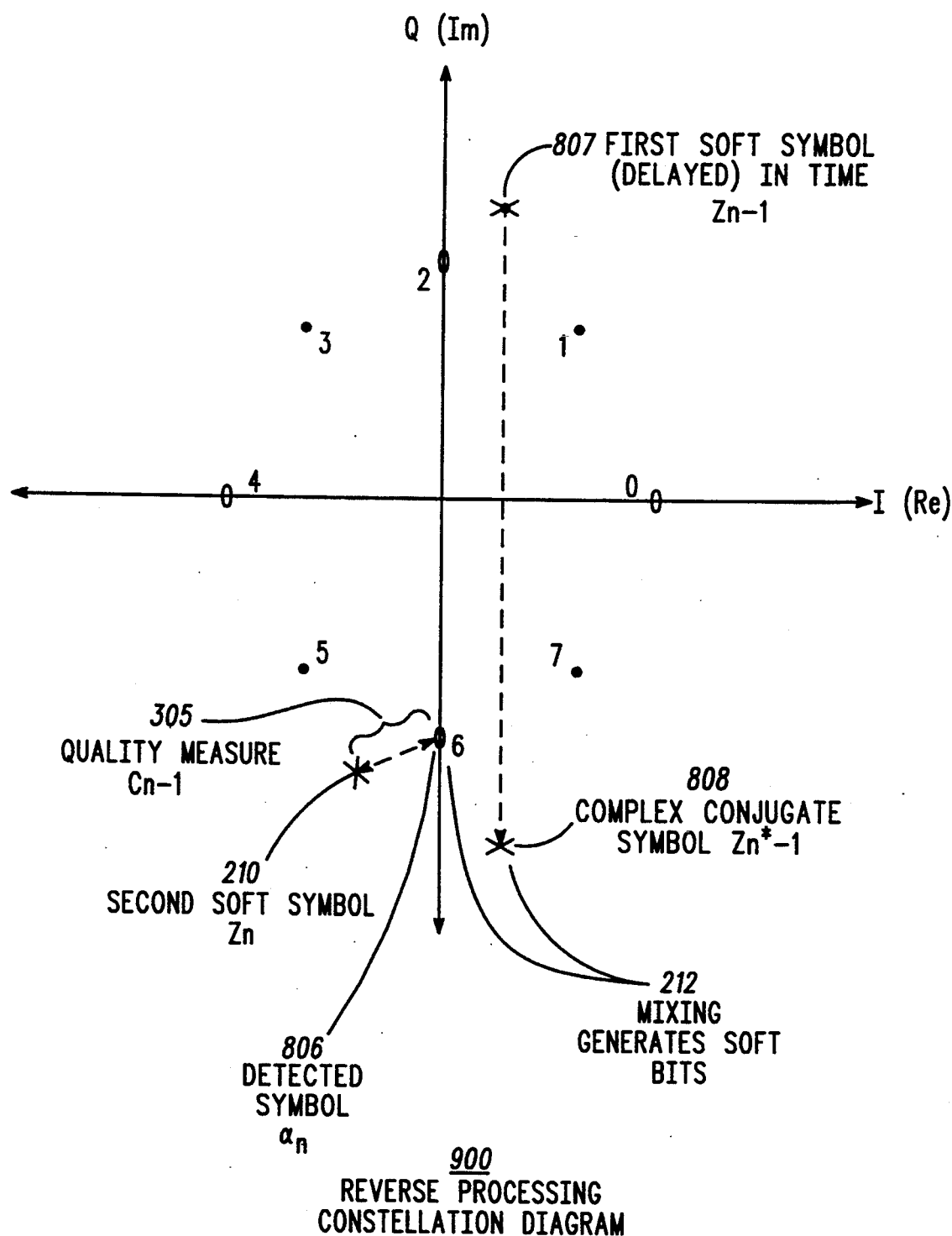
FIG. 9 illustrates the operation of the reverse processor of FIG. 8 with the reverse processing constellation diagram of a $\pi/4$ DQPSK modulated signal in accordance with the present invention.

Referring now to FIGS. 8 and 9 together, FIG. 8 illustrates a block diagram of the reverse processor 209 of FIG. 2. FIG. 9 illustrates the operation of the reverse processor of FIG. 8 with the reverse processing constellation diagram 900 of a π/4 DQPSK modulated signal. A general description of a π/4 DQPSK constellation diagram has already been discussed in conjunction with FIG. 7.

The reverse processor 209 of FIG. 8 generally comprises a switch 800, a detector 801, and a soft bit generator 802. The soft bit generator 802 generally comprises a delay element 803, a complex conjugate determiner 804, and a mixer 805. Individually, the switch 800, the detector 801, the delay element 803, the complex conjugate determiner 804, and the mixer 805 are readily known in the art, thus no further discussion will be given other than to further illustrate the present invention.

The reverse processor 209 of FIG. 8 produces soft bits by processing in a reverse direction in time. Processing in a reverse direction in time comprises the steps of detecting the second soft symbol to produce a detected symbol at line 806, and generating the soft bits at line 212 responsive to the detected symbol at line 806 and the first soft symbol.

The signal flow through the reverse processor 209 of FIG. 8 will now be explained in more detail. The soft symbols at line 210 are coupled to the delay element 803 and the detector 801. The delay element 803 delays the first soft symbol to produce a delayed symbol at line 807. The delayed symbol at line 807 is coupled to the complex conjugate determiner 804. The complex conjugate determiner 804 determines the complex conjugate of the delayed symbol at line 807 to produce a complex conjugate symbol at line 808. The second soft symbol is coupled to detector 801. Detector 801 detects the second soft symbol to produce a detected symbol at line 806.

An example of the operation of detector 801 is shown in FIG. 9, where the second soft symbol is detected to be the constellation point labeled with the number 6, since this is the nearest valid constellation point to the second soft symbol. The complex conjugate symbol at line 808 and the detected symbol at line 806 are coupled to mixer 805. The mixer 805 multiplies the complex conjugate symbol at line 808 and the detected symbol at line 806 together to produce the soft bits at line 212.

The inverted control signal at line 214 and the soft bits at line 212 are coupled to the switch 800. The switch 800 enables the soft symbols 210 to be processed through the reverse processor 209 when the quality measure of the first soft symbol is unfavorable.

FIGS. 7 and 9 can also be used to illustrate an example showing the advantage of using the present invention. Assume that the first transmitted symbol was constellation point number 3, and that the second transmitted symbol was constellation point number 6. Noise introduced in the communication channel will cause the soft symbols to have a different value than the constellation points of the transmitted signal. Because the second soft symbol is much closer to a valid $\pi/4$ DQPSK constellation point than the first soft symbol, the first soft symbol will have an unfavorable quality measure relative to the second soft symbol.

According to the teachings of the present invention, the reverse processor will be selected to convert the soft symbols to soft bits in this instance. Use of the reverse processor in this instance will produce more accurate soft bits. The unfavorable quality measure of the first soft symbol indicates that the second soft symbol is more likely to be detected correctly than the first soft symbol. Correct detection of the second soft symbol will eliminate the noise represented by the distance between the second soft symbol and the detected value of constellation point number 6 of FIG. 9. As a result of this noise reduction, more accurate soft bits are produced.

On the other hand, the forward processor would detect the first soft symbol and generate the soft bits responsive to the detected symbol and the second soft symbol. In this example the unfavorable quality measure of the first soft symbol indicates that it is more likely to be incorrectly detected. The incorrect detection of the first soft symbol actually increases the amount of noise by an amount represented by the distance between the first soft symbol, and the constellation point number 1 of FIG. 7. As a result of this increased noise, inaccurate soft bits are produced by the forward processor.

This example illustrates the advantage of the present invention as compared to the use of only forward processing. Even with the forward and reverse processing of the present invention, it is possible that a symbol will be detected incorrectly when there is a very large amount of noise on both soft symbols. However, this occurs infrequently so that the performance benefit of the present invention is not compromised. Under simulated test conditions in an additive white gaussian noise channel wherein a transmitted signal is convolutionally encoded, use of the present invention using both forward and reverse processing modes provides essentially a 1 dB improvement in the bit error rate of a received, decoded signal over the use of only the forward processing mode.

Figure 10:
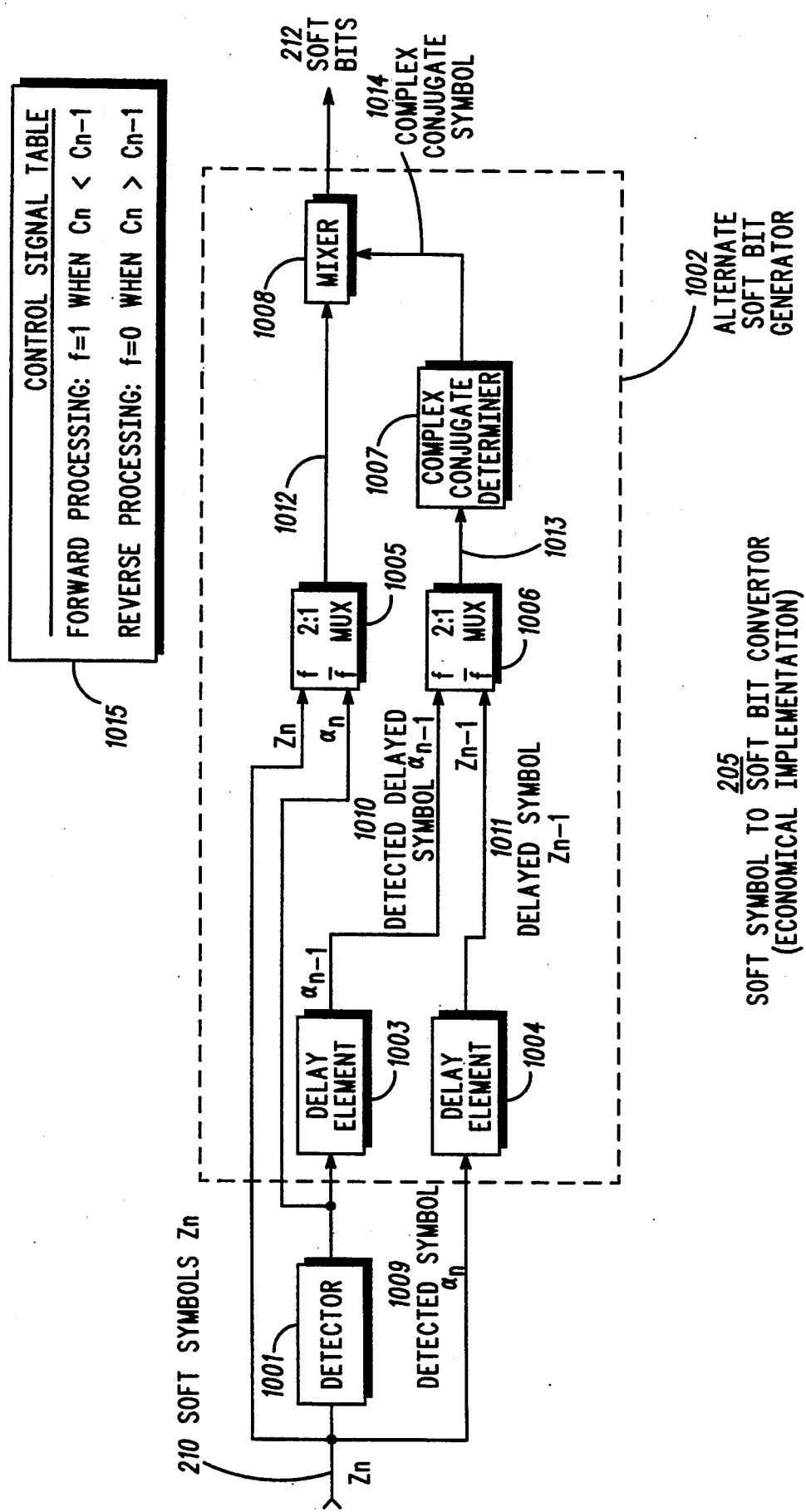
FIG. 10 illustrates a block diagram of an economical implementation of the soft symbol to soft bit converter of FIG. 2 in accordance with the present invention.

FIG. 10 illustrates a block diagram of an economical implementation of the soft symbol to soft bit converter 205 of FIG. 2. The economical implementation of the soft symbol to soft bit converter produces the same soft bits as the soft symbol to soft bit converter 205 of FIG. 2. However, the economical implementation uses fewer mixer, detector, and complex conjugate determiner elements than the soft symbol to soft bit converter 205 of FIGS. 6 and 8 together.

The economical implementation generally consists of a detector 1001 and an alternate soft symbol to soft bit generator 1002. The alternate soft bit generator 1002 generally comprises delay elements 1003 and 1004, multiplexers 1005 and 1006 and a complex conjugate determiner 1008. Individually, the alternate soft bit generator 1002, the delay elements 1003 and 1004, the multiplexers 1005 and 1006 and the complex conjugate determiner 1008 are readily known in the art, thus no further discussion will be given other than to further illustrate the present invention.

The soft symbol to soft bit converter of FIG. 10 generally comprises a detector coupled to receive the soft symbols and operative to detect the first and second soft symbols to produce first and second detected symbols, respectively. The soft bit generator is coupled to receive the first and second detected symbols and operative to generate the soft bits: responsive to the first detected symbol and the second soft symbol when the quality measure for the first soft symbol is favorable; and responsive to the second detected symbol and the first soft symbol when the quality measure for the first soft symbol is unfavorable. A decoder is coupled to receive the soft bits and operative to decode the soft bits to produce decoded bits.

The signal flow of FIG. 10 will now be explained in more detail. The soft symbols at line 210 are coupled to the multiplexer 1005, the detector 1001, and the delay element 1004. The detecter 1001 detects the soft symbol input and generates a detected symbol at line 1009. The detected symbol at line 1009 is coupled to the delay element 1003 and the multplexer 1005. The delay element 1003 delays the detected symbol and generates detected-delayed symbol at line 1010. The delay element 1004 delays the soft symbol input and produces the delayed symbol at line 1011. The detected-delayed symbol at line 1010 and the delayed symbol at line 1011 are coupled to the multiplexer at line 1006. The signals at line 1011 and at line 1010 correspond to the first soft symbol and the first detected symbol, respectively.

The multiplexer 1006 passes signal at line 1010 to the output at line 1013 when the quality measure for the first soft symbol is favorable, and passes signal at line 1011 to the output at line 1013 when the quality measure for the first soft symbol is unfavorable. The signal at line 1013 is coupled to the complex conjugate determiner at line 1007. The complex conjugate determiner determines the complex conjugate of signal at line 1013 to produce complex conjugate symbol at line 1014. The second soft symbol and the second detected symbol are coupled to the multiplexer 1005.

The multiplexer 1005 passes signal at line 210 to the output at line 1012 when the quality measure for the first soft symbol is favorable, and passes signal at line 1009 to the output at line 1012 when the quality measure for the first soft symbol is unfavorable. The complex conjugate symbol at line 1014 and multiplexer output at line 1012 are coupled to the mixer 1008. The mixer 108 multiplies the complex conjugate symbol at line 1014 and the multiplexer output at line 1012 to produce the soft bits at line 212.

Thus, the process of FIG. 10 generates the soft bits at line 212 responsive to the first detected symbol and the second soft symbol when the quality measure for the first soft symbol is favorable, and responsive to the second detected symbol and the first soft symbol when the quality measure for the first soft symbol is unfavorable.

In summary, the present invention provides an apparatus and method for converting soft symbols into soft bits. With the present invention, the accuracy of the soft bits is improved because a soft symbol quality measure is used to enable either the forward or reverse processing portion of the soft symbol to soft bit converter. By selecting the proper processing direction, the noise is removed from one of the soft symbols, resulting in the generation of more accurate soft bits. When more accurate soft bits are coupled to the decoder, the performance of the communication unit will improve and allow the communication unit to operate more effectively in a noisy channel.

What is claimed is::

1. In a communication unit that coherently demodulates differentially-encoded modulated signals to produce sequential soft symbols including first and second soft symbols, a method, for use by the communication unit, for converting the sequential soft symbols into soft bits, comprising the steps of:
   determining a quality measure for at least the first soft symbol indicating when the quality for the first soft symbol is favorable and when the quality for the first soft symbol is unfavorable;
   processing the first and second soft symbols in a forward direction in time to produce the soft bits when the quality measure for the first soft symbol is favorable; and
   processing the first and second soft symbols in a reverse direction in time to produce the soft bits when the quality measure for the first soft symbol is unfavorable.

2. A method according to claim 1 wherein the quality measure for the first soft symbol is favorable when the quality measure for the first soft symbol is greater than or equal to the quality measure for the second soft symbol and unfavorable when the quality measure for the first soft symbol is less than the quality measure for the second soft symbol.

3. A method according to claim 1 wherein the quality measure for the first soft symbol is favorable when the quality measure for the first soft .symbol is greater than or equal to a predetermined threshold and unfavorable when the quality measure for the first soft symbol is less than the predetermined threshold.

4. A method according to claim 1 further comprising the step of generating a control signal indicative of the quality measure of the first soft symbol.

5. A method according to claim 1 wherein the step of processing in a forward direction in time further comprises the steps of:
   detecting the first soft symbol to produce a detected symbol; and
   generating the soft bits responsive to the detected symbol and the second soft symbol.

6. A method according to claim 5 wherein the step of generating further comprises the steps of:
   delaying the detected symbol to produce a delayed symbol;
   determining the complex conjugate of the delayed symbol to produce a complex conjugate symbol; and
   mixing the complex conjugate symbol and the second soft symbol to produce the soft bits.

7. A method according to claim 1 wherein the step of processing in a reverse direction in time further comprises the steps of:
   detecting the second soft symbol to produce a detected symbol; and
   generating the soft bits responsive to the detected symbol and the first soft symbol.

8. A method according to claim 7 wherein the step of generating further comprises the steps of:
   delaying the first soft symbol to produce a delayed symbol;
   determining the complex conjugate of the delayed symbol to produce a complex conjugate symbol; and
   mixing the complex conjugate symbol and the detected symbol to produce the soft bits.

9. A communication unit for coherently demodulating differentially-encoded modulated signals to produce sequential soft symbols including first and second soft symbols, an apparatus, for use by the communication unit, for converting the sequential soft symbols into soft bits, comprising:
   a symbol quality determiner coupled to receive the sequential soft symbols and operative to determine a quality measure for at least the first soft symbol indicating when the quality for the first soft symbol is favorable and when the quality for the first soft symbol is unfavorable;
   a forward processor coupled to receive the sequential soft symbols and operative to process the first and second soft symbols in a forward direction in time to produce the soft bits when the quality measure for the first soft symbol is favorable; and
   a reverse processor coupled to receive the sequential soft symbols and operative to process the first and second soft symbols in a reverse direction in time to produce the soft bits when the quality measure for the first soft symbol is unfavorable.

10. An apparatus according to claim 9 wherein the quality measure for the first soft symbol is favorable when the first quality measure for the first soft symbol is greater than or equal to a quality measure for the second soft symbol and unfavorable when the quality measure for the first soft symbol is less than the quality measure for the second soft symbol.

11. An apparatus according to claim 9 wherein the quality measure for the first soft symbol is favorable when the quality measure for the first soft symbol is greater than or equal to a predetermined threshold and unfavorable when the quality measure for the first soft symbol is less than the predetermined threshold.

12. An apparatus according to claim 9 further comprising a control signal generator coupled to receive the quality measure of the first soft symbol and operative to produce a control signal indicative of the quality measure of the first soft symbol.

13. An apparatus according to claim 9 wherein the forward processor further comprises:
   a detector coupled to receive the first soft symbol and operative to detect the first soft symbol to produce a detected symbol; and
   a soft bit generator coupled to receive the detected symbol and operative to generate the soft bits responsive to the detected symbol and the second soft symbol.

14. An apparatus according to claim 13 wherein the soft bit generator further comprises:
   a delay element coupled to receive the detected symbol and operative to delay the detected symbol to produce a delayed symbol;
   a complex conjugate determiner coupled to receive the delayed symbol and operative to determine the complex conjugate of the delayed symbol to produce a complex conjugate symbol; and
   a mixer coupled to receive the complex conjugate symbol and the second soft symbol and operative to mix the complex conjugate symbol and the second soft symbol to produce the soft bits.

15. An apparatus according to claim 9 wherein the reverse processor further comprises:
   a detector coupled to receive the second soft symbol and operative to detect the second soft symbol to produce a detected symbol; and
   a soft bit generator coupled to receive the detected symbol and the first soft symbol and operative to generate the soft bits responsive to the detected symbol and the first soft symbol.

16. An apparatus according to claim 15 wherein the soft bit generator further comprises::
   a delay element coupled to receive the first soft symbol and operative to delay the first soft symbol to produce a delayed symbol;
   a complex conjugate determiner coupled to receive the delayed symbol and operative: to determine the complex conjugate of the delayed symbol to produce a complex conjugate symbol; and
   a mixer coupled to receive the complex conjugate symbol and the detected symbol and operative to mix the complex conjugate symbol and the detected symbol to produce the soft bits.

17. A method for operating a communication unit that receives and decodes differentially-encoded modulated signals transmitted thereto over a communication channel, comprising the steps of:
   coherently demodulating the differentially-encoded modulated signals to produce sequential soft symbols including first and second soft symbols;
   determining a quality measure for at least the first soft symbol indicating when the quality for the first soft symbol is favorable and when the quality for the first soft symbol is unfavorable;
   processing the first and second soft symbols in a forward direction in time to produce the soft bits when the quality measure for the first soft symbol is favorable;
   processing the first and second soft symbols in a reverse direction in time to produce the soft bits when the quality measure for the first soft symbol is unfavorable; and
   decoding the soft bits to produce decoded bits.

18. A method according to claim 17 wherein the step of processing in a forward direction in time further comprises the steps of:
   detecting the first soft symbol to produce a detected symbol; and
   generating the soft bits responsive to the detected symbol and the second soft symbol.

19. A method according to claim 17 wherein the step of processing in a reverse direction in time further comprises the steps of:
   detecting the second soft symbol to produce a detected symbol; and
   generating the soft bits responsive to the detected symbol and the first soft symbol.

20. A communication unit that receives and decodes differentially-encoded modulated signals transmitted thereto over a communication channel, comprising:
   a coherent demodulator coupled to receive the differentially-encoded modulated signals and operative to coherently demodulate the differentially-encoded modulated signals to produce sequential soft symbols including first and second soft symbols;
   a symbol quality determiner coupled to receive the sequential soft symbols and operative to determine a quality measure for at least the first soft symbol indicating when the quality for the first soft symbol is favorable and when the quality for the first soft symbol is unfavorable;
   a forward processor coupled to receive the sequential soft symbols and operative to process the first and second soft symbols in a forward direction in time to produce the soft bits when the quality measure for the first soft symbol is favorable;
   a reverse processor coupled to receive the sequential soft symbols and operative to process the first and second soft symbols in a reverse direction in time to produce the soft bits when the quality measure for the first soft symbol is unfavorable; and
   a decoder coupled to receive the soft bits and operative to decode the soft bits to produce decoded bits.

21. A communication unit according to claim 20 wherein the forward processor further comprises:
   a detector coupled to receive the first soft symbol and operative to detect the first soft symbol to produce a detected symbol; and
   a soft bit generator coupled to receive the detected symbol and operative to generate the soft bits responsive to the detected symbol and the second soft symbol.

22. A communication unit according to claim 20 the reverse processor further comprises:
   a detector coupled to receive the second soft symbol and operative to detect the second soft symbol to produce a detected symbol; and
   a soft bit generator coupled to receive the detected symbol and the first soft symbol and operative to generate the soft bits responsive to the detected symbol and the first soft symbol.

23. In a communication unit that coherently demodulates differentially-encoded, modulated signals to produce sequential soft symbols including first and second soft symbols, an apparatus, for use by the communication unit, for converting the sequential soft symbols into soft bits, comprising:
   a symbol quality determiner coupled to receive the sequential soft symbols and operative to determine a quality measure for at least the first soft symbol indicating when the quality for the first soft symbol is favorable and when the quality for the first soft symbol is unfavorable;
   a detector coupled to receive the sequential soft symbols and operative to detect the first and second soft symbols to produce first and second detected symbols, respectively; and
   a soft bit generator coupled to receive the first and second detected symbols and operative to generate the soft bits:

responsive to the first detected symbol and the second soft symbol when the quality measure for the first soft symbol is favorable; and responsive to the second detected symbol and the first soft symbol when the quality measure for the first soft symbol is unfavorable.

24. A communication unit that receives and decodes differentially-encoded modulated signals transmitted thereto over a communication channel, comprising:

a coherent demodulator coupled to receive the differentially-encoded modulated signals and operative to coherently demodulate the differentially-encoded modulated signals to produce sequential soft symbols including a first and second soft symbol;

a symbol quality determiner coupled to receive the sequential soft symbols and operative to determine a quality measure for at least the first soft symbol indicating when the quality for the first soft symbol is favorable and when the quality for the first soft symbol is unfavorable;

a detector coupled to receive the sequential soft symbols and operative to detect the first and second soft symbols to produce first and second detected symbols, respectively; and a soft bit generator coupled to receive the first and second detected symbols and operative to generate the soft bits:

responsive to the first detected symbol and the second soft symbol when the quality measure for the first soft symbol is favorable; and responsive to the second detected symbol and the first soft symbol when the quality measure for the first soft symbol is unfavorable; and a decoder coupled to receive the soft bits and operative to decode the soft bits to produce decoded bits.

* * * * *